United States Patent Office 2,918,441
Patented Dec. 22, 1959

2,918,441

FAST-CURING LINOLEUM COMPOSITION

Galen E. Graham, East Hempfield Township, Lancaster County, Pa., assignor to Armstrong Cork Company, Lancaster, Pa., a corporation of Pennsylvania No Drawing. Application June 25, 1956
Serial No. 593,335

18 Claims. (Cl. 260—19)

This invention relates generally to linoleum compositions, and more particularly to linoleum cements. Still more particularly, it relates to linoleum cements containing an additive which serves to increase the rate of cure of the linoleum composition, or to improve the color of the cured linoleum composition, or both. The invention includes both linoleum compositions and the method of making those compositions.

Linoleum cements have been made for a number of years from a drying oil and a resin by a number of methods which result in the production of a siccative oil-resin gel by oxidizing and polymerizing the drying oil generally in the presence of the resinous material. Ordinarily, linoleum cements comprise about 65% to 85% drying oil such as linseed oil and about 15% to 35% resin, such as rosin. Other resins generally utilized in the manufacture of linoleum cement may be, for example, copal, kauri gum, Congo gum, other naturally occurring resins, and synthetic resins such as urea-formaldehyde resins, phenol-formaldehyde resins, resinous petroleum derivatives such as still residues from the refining of petroleum fractions, and the like. Any drying or semi-drying oil commonly employed in the manufacture of such cements may be used. The resulting mixture may be oxidized in conventional cement-making equipment to produce a highly desirable binder which can be compounded with other ingredients to produce linoleum compositions in the conventional manner.

In recent years, tall oil and esters of tall oil made, for example, from tall oil and pentaerythritol have been used as a total or partial replacement for the normally used drying oils such as linseed oil. In many of these cements, the rosin present in the crude tall oil serves as the resin in the cement.

These cements are compounded with fillers and pigments and any other desirable additives and calendered or otherwise adhered to a backing such as burlap, muslin, or a felt. The resulting product is then cured in air at elevated temperature until the desired physical properties of the linoleum composition are reached.

The period of cure may run several weeks and thus involve a considerable tie-up of stoves and auxiliary equipment. Additionally, the prolonged period of cure often produces—as a result of the chemical reactions taking place in the linoleum composition, a discoloration or staining of the composition; this is particularly true where light or pastel shades are used. Therefore, anything that can be done to shorten the period of cure and to minimize the staining resulting from the curing reactions would be highly advantageous to the linoleum industry. Unfortunately, curing accelerators from other arts such as the rubber art cannot be extrapolated into the linoleum art. For example, sulfur-containing curing systems blacken linoleum, and peroxide-containing systems do not accelerate linoleum cure at all.

Accordingly, it is an object of the present invention to supply a linoleum composition which will cure in a shorter period of time than those compositions normally used. It is a further object to supply a composition which will undergo less stove staining than the normal compositions.

To these ends, the invention contemplates a linoleum composition comprising a linoleum cement containing oxidized siccative oil and resin and about 1% to about 15% by weight of said cement of an additive. The additive is an alkali metal or alkaline earth metal salt of an aliphatic hydrocarbon-substituted polyalkylol phenol selected from the group consisting of polymethylol and polyethylol phenols.

The compounds to be added to a linoleum cement containing oxidized siccative oil and resin may be generally defined as the alkali metal or alkaline earth metal salts of monomeric aliphatic hydrocarbon-substituted polyalkylol phenols. More particularly, the compounds are alkali metal salts or the alkaline earth metal salts of polymethylol or polyethylol phenols wherein an aromatic ring is substituted with an aliphatic hydrocarbon group.

The compounds may be further defined as metal salts of phenols having the formula

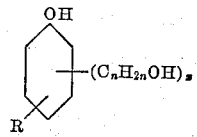

wherein $n$ is an integer from 1 to 2 inclusive, $x$ is an integer from 2 to 4 inclusive, and R is selected from the group consisting of $C_yH_{2y+1}$— and

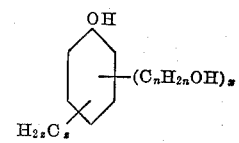

wherein $y$ is an integer from 1 to 30 inclusive, preferably 1 to 8 inclusive, $z$ is an integer from 1 to 5 inclusive, and $n$ and $x$ have the meanings assigned above. Preferably R and $C_zH_{2z}$— will be in the position para to the phenolic OH group.

The salts of the phenolic compounds useful in the present invention can be made in any manner well-known to those skilled in the art. They may be made by reacting as a starting material a para-aliphatic hydrocarbon-substituted phenol having the two ortho positions unoccupied with a considerable molar excess of formaldehyde and acetaldehyde. The mole ratio of the aldehyde to the phenol will usually be slightly in excess of 2:1. The reaction must be carried out in the presence of a strong alkaline catalyst. Alkali metal oxides and hydroxides or alkaline earth metal oxides and hydroxides in appropriate amounts will serve as the catalyst and at the same time will yield as the final product the alkaline earth metal salt of the phenols which is to be used in the present invention. Where the oxides or hydroxides are themselves used as a catalyst, the amount should be sufficient on a stoichiometric basis to yield the salt of the resulting polyalkylol phenol.

Alternatively to using an alkaline earth metal salt as both a catalyst and a reactant, an alkaline catalyst, especially alkali metal hydroxides, may be used to catalyze the reaction between the aldehyde and the hydrocarbon-substituted phenol. Subsequent to the formation of the polyalkylol phenol, a soluble alkaline earth metal salt in water solution in stoichiometric amounts may be added to the polyalkylol phenol in order to produce the desired alkaline earth metal salt. Examples of the alkaline earth metal compounds to be added to the polyalkylol phenol are magnesium chloride, barium chloride, calcium chloride, calcium hydroxide, and other alkaline earth metal salts.

The mixture of the phenol, aldehyde, and alkaline catalyst is heated at a suitably low temperature, for example 25°–40° C. This reaction will produce polyalkylol phenol compounds as monomers, for example the para-substituted 2,6-dialkylol phenol; where the alkali metal or alkaline earth metal oxides and hydroxides are used as the alkaline catalyst, the resulting product will be the salt directly.

Temperature higher than about 40° C. will produce some polymer which reduces the activity of the compound as used in the present invention. The salfts of the polyalkylol phenols may be isolated readily from the reaction mixture by methods well-known in the art, as by simple filtration or by concentration by stripping water from the mixture by warning under vacuum, followed by filtration, or by precipitation with an organic solvent such as acetone. In all cases, the temperature must be kept sufficiently low to maintain the polyalkylol phenols in the form of monomers and to prevent their condensation into resins.

The phenol used to make the monomeric compounds useful in the present invention may have any aliphatic hydrocarbon group in the position para to the phenolic hydroxyl group. Should an aromatic group such as phenyl or naphthyl occupy the para position, the resulting comopund is unsuitable in the present invention. The aliphatic hydrocarbon group should be an alkyl group containing 1 to 30 carbon atoms. Preferred examples of the alkyl group are methyl, tertiary butyl, and octyl. Nonhydrocarbon groups such as chloro render the compound inoperable.

The starting phenol may also be a bis-phenol. Examples of such compounds are bis-(4-hydroxy-phenyl)-methane; bis-(2-hydroxy-phenyl)-methane; bis-(4-hydroxy - 2 - methyl-phenyl)-methane; beta,beta-bis(4-hydroxy-phenyl)-propane (bis-phenol A); beta,beta-(2,4'-dihydroxy - diphenyl) - propane; beta,beta-bis(2-hydroxy-phenyl) - propane; beta,beta - bis(4-hydroxy-2-methyl-phenyl) - butane; and beta,beta(bis - 2,4'-dihydroxyl-phenyl)-pentane. Where there bis-phenols are used as the starting phenol, it is preferred that sufficient aldehyde be added to the reaction mixture to form the tetra-alkylol compound. Thus, the mole ratio of aldehyde to bis-phenol will be slightly in excess of 4:1. Conditions of reaction otherwise will remain substantially the same.

It must be emphasized that the compounds useful in the present invention are monomers. Thus, the reaction of the aldehyde and the phenol must be stopped before condensation takes place with the attendant polymer formation. Such resins, while useful in some respects when incorporated in a linoleum composition, also tend to impart characteristics considered undesirable. For example, the addition of such resins may reduce the flexibility of the final product. An outstanding disadvantage of the use of resins is the difficulty of adequately dispersing the resin in the linoleum cement. Intimate and thorough dispersion is essential, yet no satisfactory means of accomplishing this has yet been found. The present compounds, however, can be quickly and thoroughly dispersed in a linoleum cement on a mill or other equipment standard for handling linoleum cement. Additionally, several of the present compounds shorten the cure time as much as 25% more than does the same amount of resin.

As mentioned above, the amount of the salts of the polyalkylol phenols to be incorporated in the linoleum composition will be in the range of about 1% to about 15% by weight of the linoleum cement gel. Amounts less than about 1% do not give any practical beneficial results, although stove staining may be improved where amounts slightly under 1% by weight are added. Amounts greater than about 15% by weight, aside from being unnecessary and thus constituting a waste of the compound, may cause undesirable property changes in the final cured linoleum composition; for example, the cured composition may possess insufficient flexibility. It has been found that in the lower range of amounts, that is about 1% to about 3% or 4% by weight, many of the compounds do not give an increased rate of cure to the composition. At these lower levels, however, a definite advantage in the reduction of stove staining will be achieved. At higher levels from about 4% on up to the maximum of about 15% by weight, the increased rate of cure becomes definite and often dramatic and the advantage of color improvement is maintained. The preferred amount is in the range of about 4%–8% by weight. It is a general rule in linoleum manufacture that the longer the period of cure required, the greater the degree of stove staining. Thus, any system which shortens the cure period must also diminish the stove staining. In the case of the present invention, however, the polyalkylol phenols appear to diminish stove staining by a function other than that of reducing the period of cure. This appears true in view of the observation that small amounts of the compounds—too small to reduce the period of cure, nevertheless reduce stove staining. All of the above amounts are based on the initial weight of a linoleum cement gel before replacement with the additive.

The mechanism by which the salts of polyalkylol phenols useful in the present invention operate is not known. It is not to be anticipated that they would play the role of curing accelerators and staining diminshers. This is true for several reasons. First of all, the parent phenols from which the compounds useful in the present invention are made actually inhibit the cure of linoleum. Additionally, the monoalkylol phenols carrying a single methylol or ethylol group inhibit the formation of a tough compound resulting from the oxidation of drying oils. In U.S. Patent No. 2,715,072, issued August 9, 1955, to Chenicek et al., this inhibitory effect of monoalkylol (monoalkoxy) phenols on drying oil compositions is set forth in some detail. With this background, it is unobvious and unexpected to find that the polyalkylol (polyalkoxy) phenols should have just the reverse effect.

The following examples illustrate several embodiments of the invention. All parts are by weight unless otherwise stated.

*Example I*

Into a stainless steel container containing 800 parts of 10% aqueous sodium hydroxide solution (2 moles NaOH) was introduced 228 parts (1 mole) beta,beta-bis-(4-hydroxy-phenyl)-propane. The temperature rose to 30°–35° C. After cooling to room temperature (about 28° C.) there was added 330 parts (4.4 moles) 40% solution of formaldehyde. The mixture was allowed to stand at room temperature for 24 hours.

At the end of that period there was added 555 parts (1 mole) of 20% aqueous solution of calcium chloride. The resultant precipitate of the calcium salt of the tetra-methylol derivative of bis-phenol A was filtered out, washed with water, dried, and used where indicated in the following examples.

In the same manner, the magnesium derivative was made by adding 475 parts (1 mole) of a 20% aqueous solution of magnesium chloride to the mixture that was allowed to stand for 24 hours.

The sodium derivative was made by pouring the mixture after standing for 24 hours into a large excess of acetone and quickly filtering out the resulting precipitate.

Other salts identified in the following examples were prepared in similar manner.

*Example II*

The following compositions were mill mixed and then sheeted on a mill to 0.050" gauge. Samples were then cured in a forced air oven at 210° F. to a standard end point of 35% indentation produced by 0.178" diameter tip under a 150-pound load for 30 seconds.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Barium salt of the tetramethylol derivative of beta,beta-bis-(4-hydroxy phenyl)-propane | 11 | ---------- |

Linoleum Cement A is an oxidized mixture containing 56% of the partial esters of crude tall oil and pentaerythritol and 44% linseed oil.
Cure time for control mix equals 5 days.
Cure time for experimental mix equals 2 days.

*Example III*

The following compositions were treated as in Example II.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Calcium salt of dimethylol para-cresol | 11 | ---------- |

The mix was sheeted on a mill to 0.125" gauge and cured at 195° F. to the standard end point.
Cure time for control mix equals 26 days.
Cure time for experimental mix equals 7 days.

*Example IV*

The following compositions were treated as in Example II.

| Ingredients | Parts | Parts (Control) |
|---|---|---|
| Linoleum Cement A | 211 | 222 |
| Wood flour | 144 | 144 |
| Whiting (calcium carbonate) | 234 | 234 |
| Calcium salt of the tetramethylol derivative of beta,beta-bis-(4-hydroxy phenyl)-propane | 11 | ---------- |

Cure time for control mix equals 22 days.
Cure time for experimental mix equals 12 days.

*Example V*

The following compositions were treated as in Example II.

| Ingredients | Parts | Parts (Control) |
|---|---|---|
| Linoleum Cement A | 200 | 222 |
| Wood flour | 144 | 144 |
| Whiting (calcium carbonate) | 234 | 234 |
| Calcium salt of the tetramethylol derivative of beta,beta-bis-(4-hydroxy phenyl)-propane | 22 | ---------- |

Cure time for control mix equals 22 days.
Cure time for experimental mix equals 2 days.

*Example VI*

The following compositions were treated as in Example II except the sheet was 0.125" gauge.

| Ingredients | Parts #1 | Parts #2 | Parts #3 | Parts (Control) |
|---|---|---|---|---|
| Linoleum Cement B | 211 | 200 | 189 | 222 |
| Wood flour | 144 | 144 | 144 | 144 |
| Whiting (calcium carbonate) | 234 | 234 | 234 | 234 |
| Calcium salt of the tetramethylol derivative of beta,beta-bis-(4-hydroxy phenyl)-propane | 11 | 22 | 33 | ---------- |

Linoleum Cement B is an oxidized mixture containing 52% partial esters of tall oil and pentaerythritol and 48% linseed oil.
Cure time for control mix equals 24 days.
Cure time for experimental mix #1 equals 11 days.
Cure time for experimental mix #2 equals 4 days.
Cure time for experimental mix #3 equals 1 day.

*Example VII*

The following compositions were treated as in Example VI.

| Ingredients | Parts #1 | Parts #2 | Parts (Control) |
|---|---|---|---|
| Linoleum Cement D | 211 | 200 | 222 |
| Wood flour | 144 | 144 | 144 |
| Whiting (calcium carbonate) | 234 | 234 | 234 |
| Calcium salt of the tetramethylol derivative of beta,beta-bis-(4-hydroxy phenyl)-propane | 11 | 22 | ---------- |

Linoleum Cement D is an oxidized mixture containing 69% linseed oil, 21% wood rosin, and 10% crude tall oil.
Cure time for control mix equals 12 days.
Cure time for experimental mix #1 equals 4 days.
Cure time for experimental mix #2 equals 1 day.

*Example VIII*

The following compositions were treated as in Example VI.

| Ingredients | Parts #1 | Parts #2 | Parts (Control) |
|---|---|---|---|
| Linoleum Cement C | 211 | 200 | 222 |
| Wood flour | 144 | 144 | 144 |
| Whiting | 234 | 234 | 234 |
| Calcium salt of the tetramethylol derivative of beta,beta-bis-(4-hydroxy phenyl)-propane | 11 | 22 | ---------- |

Linoleum Cement C is an oxidized mixture containing 68.54% linseed oil, 20.86% wood rosin, 9.93% crude tall oil, and 0.66% lime.
Cure time for control mix equals 18 days.
Cure time for experimental mix #1 equals 5 days.
Cure time for experimental mix #2 equals 1 day.

*Example IX*

The following compositions were treated as in Example VI.

| Ingredients | Parts #1 | Parts #2 | Parts #3 | Parts (Control) |
|---|---|---|---|---|
| Linoleum Cement B | 211 | -------- | -------- | (222) |
| Linoleum Cement C | -------- | 211 | -------- | (222) |
| Linoleum Cement D | -------- | -------- | 211 | (222) |
| Wood flour | 144 | 144 | 144 | 144 |
| Whiting | 234 | 234 | 234 | 234 |
| Sodium salt of the tetramethylol derivative of beta,beta-bis-(4-hydroxy phenyl)-propane | 11 | 11 | 11 | -------- |

The following tabulation shows the results.

| Experimental Mix # | Cure Time in Days of Experimental Mix | Cure Time in Days of Control |
|---|---|---|
| 1 | 9 | 24 |
| 2 | 9 | 18 |
| 3 | 3 | 12 |

Example X

The following compositions were treated as in Example VI.

| Ingredients | Parts #1 | Parts #2 | Parts (Control) |
|---|---|---|---|
| Linoleum Cement B | 211 | 200 | 222 |
| Wood flour | 144 | 144 | 144 |
| Whiting | 234 | 234 | 234 |
| Calcium salt of dimethylol derivative of p-propyl phenol | 11 | 22 | -------- |

Cure time for control mix equals 24 days.
Cure time for experimental mix #1 equals 13 days.
Cure time for experimental mix #2 equals 2 days.

Example XI

The following compositions were treated as in Example VI.

| Ingredients | Parts #1 | Parts #2 | Parts #3 | Parts (Control) |
|---|---|---|---|---|
| Linoleum Cement A | 211 | -------- | -------- | (222) |
| Linoleum Cement C | -------- | 211 | -------- | (222) |
| Linoleum Cement D | -------- | -------- | 211 | (222) |
| Wood flour | 144 | 144 | 144 | 144 |
| Whiting | 234 | 234 | 234 | 234 |
| Magnesium salt of tetramethylol derivative of beta,beta-bis-(4-hydroxy phenyl)-propane | 11 | 11 | 11 | -------- |

The following tabulation shows the results.

| Experimental Mix # | Cure Time in Days of Experimental Mix | Cure Time in Days of Control |
|---|---|---|
| 1 | 10 | 24 |
| 2 | 6 | 18 |
| 3 | 4 | 12 |

Example XII

The following compositions were treated as in Example VI.

| Ingredients | Parts #1 | Parts #2 | Parts #3 | Parts (Control) |
|---|---|---|---|---|
| Linoleum Cement B | 211 | 200 | 189 | 222 |
| Wood flour | 144 | 144 | 144 | 144 |
| Whiting | 234 | 234 | 234 | 234 |
| Magnesium salt of tetramethylol derivative of beta,beta-bis-(4-hydroxy phenyl)-propane | 11 | 22 | 33 | -------- |

Cure time for control mix equals 24 days.
Cure time for experimental mix #1 equals 14 days.
Cure time for experimental mix #2 equals 3 days.
Cure time for experimental mix #3 equals 3 days.

I claim:

1. A linoleum composition comprising filler and a linoleum cement containing 65%–85% by weight oxidized siccative fat oil and 35%–15% by weight rosin and about 1% to about 15% by weight of said oil and rosin of a metal salt of a monomeric aliphatic hydrocarbon-substituted polyalkylol phenol having the formula

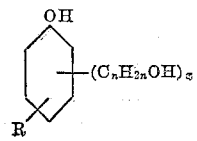

wherein $n$ is an integer from 1 to 2 inclusive, $x$ is an integer from 2 to 4 inclusive, and R is selected from the group consisting of $C_yH_{2y+1}$ and

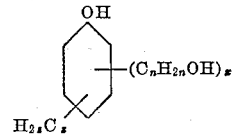

wherein $y$ is an integer from 1 to 30 inclusive, $z$ is an integer from 1 to 5 inclusive, and $n$ and $x$ have the meanings assigned above, said metal being selected from the group consisting of alkali metals and alkaline earth metals.

2. A composition according to claim 1 wherein said amount of said salt is in the range of about 4% to about 8%.

3. A composition according to claim 1 wherein said polyalkylol phenol comprises the reaction product of about 2 moles of formaldehyde per mole of mononuclear phenol.

4. A composition according to claim 1 wherein said polyalkylol phenol comprises a reaction product of about 4 moles of formaldehyde per each mole of bis-phenol.

5. A composition according to claim 1 wherein said polyalkylol phenol comprises para-tertiary butyl 2,6-dimethylol phenol.

6. A composition according to claim 1 wherein said polyalkylol phenol comprises beta,beta-(2,4'-dihydroxy diphenyl)-propane.

7. A composition according to claim 1 wherein said metal comprises calcium.

8. A composition according to claim 1 wherein said metal comprises barium.

9. A composition according to claim 1 wherein said metal comprises sodium.

10. The method of forming an improved linoleum composition which comprises admixing with filler and a linoleum cement containing 65%–85% by weight oxidized siccative fat oil and 35%–15% by weight rosin an amount of about 1% to about 15% by weight of said cement of a metal salt selected from the group consisting of alkali metals and alkaline earth metal salts of a monomeric aliphatic hydrocarbon-substituted polymethylol phenol having the formula

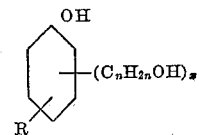

wherein $n$ is an integer from 1 to 2 inclusive, $x$ is an integer from 2 to 4 inclusive, and R is selected from the group consisting of $C_yH_{2y+1}$— and

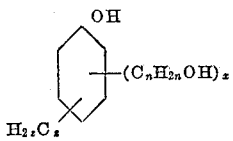

wherein $v$ is an integer from 1 to 30 inclusive, $z$ is an integer from 1 to 5 inclusive, and $n$ and $x$ have the meanings assigned above, said metal being selected from the group consisting of alkali metals and alkaline earth metals.

11. The method according to claim 10 wherein said polyalkylol phenol comprises a tetra-methylol phenol.

12. The method according to claim 10 wherein said polyalkylol phenol comprises a dimethylol mononuclear phenol.

13. The method according to claim 10 wherein said amount is in the range of about 4% to about 8%.

14. The method according to claim 10 wherein said polymethylol phenol comprises the reaction product of about 2 moles of formaldehyde per each mole of mononuclear phenol.

15. The method according to claim 10 wherein said polymethylol phenol comprises the reaction product of about 4 moles of formaldehyde per each mole bis-phenol.

16. The method according to claim 10 wherein said metal comprises calcium.

17. The method according to claim 10 wherein said metal comprises sodium.

18. The method according to claim 10 wherein said polymethylol phenol comprises beta,beta-(2,4'-dihydroxy diphenyl)-propane.

References Cited in the file of this patent

UNITED STATES PATENTS

| | | |
|---|---|---|
| 2,142,076 | Rust | Dec. 27, 1938 |
| 2,169,361 | Kohn | Aug. 15, 1939 |
| 2,224,237 | Spitzli | Dec. 10, 1940 |
| 2,345,357 | Powers | Mar. 28, 1944 |
| 2,389,078 | Powers | Nov. 13, 1945 |
| 2,433,833 | Auer | Jan. 6, 1948 |
| 2,497,449 | Gutkin | Feb. 14, 1950 |
| 2,579,329 | Martin | Dec. 18, 1951 |
| 2,606,934 | Martin | Apr. 12, 1952 |
| 2,609,352 | Kvalnes | Sept. 2, 1952 |
| 2,744,882 | Bender et al. | May 8, 1956 |

FOREIGN PATENTS

| | | |
|---|---|---|
| 672,820 | Great Britain | May 28, 1952 |

OTHER REFERENCES

Carswell: Phenoplasts, pages 9–12, Interscience, 1947.
Martin: The Chemistry of Phenolic Resins, pages 87–88, John Wiley, 1956.

UNITED STATES PATENT OFFICE
CERTIFICATE OF CORRECTION

Patent No. 2,918,441

December 22, 1959

Galen E. Graham

It is hereby certified that error appears in the printed specification of the above numbered patent requiring correction and that the said Letters Patent should read as corrected below.

Column 3, line 11, for "Temperature" read -- Temperatures --; line 13, for "salfts" read -- salts --; line 17, for "warning" read -- warming --; line 40, for "there" read -- these --; column 7, line 67, for "and rosin" read -- and said rosin --; column 8, line 3, for "$C_yH_{2y+1}$" read -- $C_yH_{2y+1}$ --; line 61, for "v", in italics, read -- y -- in italics.

Signed and sealed this 31st day of May 1960.

(SEAL)
Attest:

KARL H. AXLINE
Attesting Officer

ROBERT C. WATSON
Commissioner of Patents